United States Patent
Budaragin

[11] Patent Number: 5,952,769
[45] Date of Patent: *Sep. 14, 1999

[54] METHOD FOR COATING SPARKPLUGS

[75] Inventor: Leonid Viktorovich Budaragin, Moscow, Russian Federation

[73] Assignee: Sparco, Inc., Roswell, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/624,139

[22] Filed: Mar. 29, 1996

[51] Int. Cl.⁶ .............................. H01T 13/20; B05D 3/02
[52] U.S. Cl. ...................... 313/141; 313/144; 313/127; 313/137; 427/376.1; 427/226
[58] Field of Search .................. 427/376.1, 226; 313/141, 144, 137, 127

[56] References Cited

U.S. PATENT DOCUMENTS

| | | |
|---|---|---|
| 3,673,452 | 6/1972 | Brennen . |
| 3,967,149 | 6/1976 | Eaton et al. . |
| 3,984,717 | 10/1976 | Romanowski et al. . |
| 4,267,483 | 5/1981 | Nakajima et al. ............... 313/143 |
| 4,307,061 | 12/1981 | Sarholz . |
| 4,530,340 | 7/1985 | Totman . |
| 4,743,793 | 5/1988 | Toya et al. . |
| 4,786,267 | 11/1988 | Toya et al. . |
| 4,826,462 | 5/1989 | Lenk . |
| 4,853,582 | 8/1989 | Sato et al. . |
| 4,881,913 | 11/1989 | Mann . |
| 4,937,484 | 6/1990 | Ishino . |
| 4,963,112 | 10/1990 | Benedikt et al. . |
| 4,972,811 | 11/1990 | Baresel et al. . |
| 5,109,178 | 4/1992 | Yoshida et al. ............... 313/137 |
| 5,274,298 | 12/1993 | Cassidy et al. . |

FOREIGN PATENT DOCUMENTS 923232  7/1980  Russian Federation .

OTHER PUBLICATIONS

Kling, Anton, et al., Ignition Devices, e.g., Spark Plugs, Hot Plugs, and the Like, Consisting of a Ceramic or Metallic Base and Whose Tip is Coated with an Oxide, and Their Manufacture, *Chemical Abstracts*, vol. 117, No. 8, Sec. 157, Abstract No. 0705045.

Ooshima, Takafumi, "Durable Spark Plugs with Metal Oxide–Treated Tips," *Chemical Abstracts*, vol. 105, No. 26, Sec. 156, Abstract No. 231052w.

*Primary Examiner*—Michael Lusignan
*Assistant Examiner*—Bret Chen
*Attorney, Agent, or Firm*—Kilpatrick Stockton LLP; James L. Ewing, IV; Bruce D. Gray

[57] ABSTRACT

The present process for the production of sparkplugs provides coated sparkplugs that are resistant to carbonization or lead fouling of the central ceramic insulator. A liquid metal carboxylate composition is applied to the insulator of the sparkplug and subjected to heat treatment at a temperature preferably above 400° C. to form a durable metal oxide layer on the insulator.

31 Claims, 3 Drawing Sheets

METHOD FOR COATING SPARKPLUGS

FIELD OF THE INVENTION

The present invention relates to the area of sparkplug manufacturing. In particular, the present invention is a method for coating sparkplug components, including the ceramic insulator, with a metal oxide coating, to prevent or inhibit the buildup of various contaminants on the coated structure and provide enhanced engine performance and longer sparkplug life.

BACKGROUND OF THE INVENTION

Sparkplugs in internal combustion engines, and igniters in gas turbines and jet engines, are used for igniting combustible mixtures of gases and vapors.

Typically, sparkplugs used in internal combustion engines include a ceramic insulator, which surrounds a central electrode. The end portion of the sparkplug, including the end of the ceramic insulator, is exposed to the interior of the combustion chamber of the engine. During normal operation of the engine, there are times when operating conditions contaminate the ceramic insulator of the sparkplug. Often, this contamination takes the form of electroconducting coke. This contamination can occur, for example, during engine idle when the engine has just been started and the fuel mixture is enriched, when the weather is cold, and when the engine is not properly tuned. It has been found that even when an engine is properly tuned, carbonization of the sparkplug can still take place, for example, when driving on a cold engine or using an enriched fuel mixture. The contamination can also take the form of lead-oxide, due to the presence of lead in leaded gasolines.

The contamination of the sparkplug's ceramic insulator can interfere with the operation of the sparkplug. For example, contamination with electroconductive coke or lead oxide reduces the sparking ability of the sparkplug, because the electrical current dissipates through the contaminant layer to the metal casing of the sparkplug.

Contamination of the insulator can shorten the life span of the sparkplug and make it difficult to start the engine, especially during cold weather. It can also degrade fuel economy by increasing gasoline consumption. Furthermore, it can result in unstable ignition or combustion, which can damage the catalytic converters used as emission control equipment on modern automobiles. This occurs as a result of the discharge of incompletely combusted products into the exhaust system. As catalytic converters are expensive automotive components, it would be desirable to minimize damage to them.

For the reasons set forth above, the demand for sparkplugs and igniters which are resistant to contamination is increasing. These sparkplugs would have extended lifespans. Various solutions for reducing the contamination of the sparkplug insulator have been proposed. However, all of these solutions have significant disadvantages.

One method of reducing sparkplug contamination is by using a sparkplug which has a lower hotbulb number than that recommended by the engine manufacturer. This method has serious deficiencies. While it may reduce contamination of the insulator, the central electrode could be damaged or destroyed during engine operation. If this were to occur, fragments of the central electrode could damage the cylinder/piston system of the engine and thus, ruin the engine.

Another method for preventing contamination of a sparkplug's central insulator is disclosed in U.S. Pat. No. 4,937,484. This patent discloses a heat-resistant coating for a sparkplug's ceramic insulator. The coating is formed from a solution of silicone oil, paraffin and ozokerite which are combined in a manner that increases the coating's viscosity. This coating is designed to be permanent and durable. However, this coating has a disadvantage, in that it increases the temperature of the end portion or tip of the sparkplug beyond the range for which the sparkplug was designed. This can reduce the lifespan of the sparkplug during ordinary use.

U.S. Pat. No. 5,174,298 discloses an ablative coating for a spark plug insulator. This coating provides protection from coke formation during the initial life of the vehicle. However, the coating is designed to be relatively quickly degraded by engine operation, and eventually burns off of the ceramic insulator, exposing it to contamination. The ablative coating is the result of the application of an aqueous mixture of a suspension material selected from kaolin, ball clay, bentonite, quartz, zirconia, and combinations thereof and a binder selected from colloidal silica, colloidal alumina, methyl cellulose, polyvinyl alcohol, and combinations thereof.

The most prevalent method used to prevent carbonization of the sparkplug is through the use of deep hydrocarbon oxidation catalysts as the central or side electrode. The catalyst is either the material used to form the electrode or a metallic coating thereon. These catalytic materials are noble metals, such as platinum, palladium, silver or alloys thereof.

Generally, platinum is the preferred material for these sparkplugs and platinum electrode sparkplugs are commercially available from BOSCH and CHAMPION. These sparkplugs are prepared by introducing a platinum wire into the mold for manufacturing the central electrode. Then, powdered ceramics are added to the mold and the mixture is dried and sintered. After cooling, the material is mechanically treated to provide a central electrode with a platinum cathode that serves as the deep hydrocarbon oxidation catalyst. The catalytic action of the electrode prevents contamination of the insulator.

One method of coating the central sparkplug electrode stem with catalytically active noble metals, such as silver, palladium or platinum, is disclosed in German Patent 3918272. The primary disadvantage of this method is its high cost. The use of platinum and other noble metals adds significantly to the cost of materials used to form the sparkplug. For example, the electrode may require several grams of platinum in each sparkplug. In addition, special ceramics, which have a coefficient of thermal expansion that is compatible with platinum, are also required.

It would be desirable to coat the ceramic surface of the central electrode with a relatively inexpensive, non-conductive deep oxidation catalyst. However, the use of other catalysts, such as electrically insulating metal oxide catalysts, has not been viable, because the methods for production of these coatings are ineffective or commercially impractical for use on sparkplugs.

One known method for the formation of metal oxide coatings is via the electrochemical sedimentation of metal oxides from solution. This method can not be used to coat sparkplug insulators because the ceramic material is not electrically conductive, a requirement of this method.

Another method of forming metal oxide coatings is a sputtering process. In this process, a metal oxide powder is vaporized, using, for example, laser, plasma, flame or detonation methods. The vapors are carried in a gas carrier until they reach the surface to be coated. This surface is generally relatively cool, so that the vaporized metal oxide powder condenses on the surface.

The sputtering process is impractical and expensive to use for coating sparkplugs, making it commercially unreasonable. It requires the use of specialized manufacturing equipment to maintain the necessary vacuum conditions. These requirements increase the cost and difficulty of manufacturing the sparkplug. Further, the materials used in the sputtering process, solid solutions of oxides, are expensive.

Detonation spraying is another possible method that could be used to produce coatings. However, this method requires a large amount of catalyst material and specialized manufacturing equipment.

Another potential method for the production of catalytic coatings is by deposition of metal oxides from aqueous solutions, followed by heat treatment. However, this method requires the use of a binder, such as phosphoric acid, in the metal oxide solution. The presence of phosphorus containing compounds in the catalytic layer reduces its catalytic activity.

A further potential method is chemical vapor deposition (CVD) However, CVD requires the use of a carefully developed system of safety equipment, as toxic components are used in this process. These materials include β-diketones and metal-carbonyl complexes.

Another known method for the deposition of a metal oxide coating on a substrate is described in U.S.S.R. Inventors Certificate No. 923232. This process uses a single trivalent metal salt formed by adding the metal to a solution of carboxylic acids. The salt is applied to a substrate and subjected to a temperature of 500 to 600° C. for 20 to 30 seconds in a nonoxidizing atmosphere.

This process suffers from several drawbacks. First, it requires the use of a special furnace that contains a nonoxidizing atmosphere. In addition, the short heat treatment time produces a coating that has internal strains, leading to the lack of a well defined crystalline structure and creating a highly absorptive coating that can absorb water, gases or hydrocarbons. This absorption can make the coating conductive. Furthermore, the use of a single metal in the coating is undesirable because a number of metals, for example zirconium, do not form resistant coatings without additional additives. This would create weak coatings. Finally, this process only uses trivalent and tetravalent metals. As a result, desirable materials, such as nickel, copper and gold, can not be used therein.

As noted above, the above-referenced conventional coating processes, which have not been used to coat sparkplugs, suffer from a variety of disadvantages that would make them undesirable for the commercial-scale production of coated sparkplugs. In addition, the coatings produced by these methods are relatively thick. This could lower the adhesion between a coating formed using these methods and the sparkplug, and could cause scaling or flaking off of the coating. Further, the above methods require additional procedures to remove the coating from areas of the surface where no coating is desired. Finally, all of the above methods have high material consumption, increasing their cost.

Accordingly, it would be desirable to provide a low-cost, convenient method to form a metal oxide coating on the central insulator of a sparkplug.

One object of the present invention is to provide a commercially viable method for the production of sparkplugs which are resistant to carbonization or lead-oxide buildup.

Another object of the present invention is to provide a sparkplug that is resistant to carbonization or lead oxide build up, due to the presence of a metal oxide coating on the central ceramic insulator insulator of the plug. A related object of the present invention is to provide a sparkplug that will provide longer life and greater efficiency when used with leaded gasolines, which are still in widespread use in many countries outside the United States.

A further object of the present invention is to provide a sparkplug with an extended lifespan over a variety of operating conditions, without the need to use expensive components such as platinum.

A further object of the present invention is to provide a method for depositing a metal oxide coating onto a substrate, including the ceramic insulator of a sparkplug, that is relatively easy to carry out, without using complicated equipment or materials, and using relatively non-toxic materials as compared to prior art methods.

SUMMARY OF THE INVENTION

In a basic aspect, the present invention is a method for the production of a sparkplug that includes a metal oxide coating on the sparkplug's ceramic insulator. This coating prevents or inhibits contamination of the sparkplug's ceramic insulator by carbon-based materials, such as coke, or by lead-oxide. The method can be used either during the sparkplug manufacturing process, for example, on an intermediate assembly, such as the ceramic insulator, or on the completed sparkplug.

The present method for coating sparkplugs generally comprises the steps of:

(a) applying a liquid metal carboxylate composition, or a solution thereof, to a sparkplug or to a ceramic sparkplug insulator; and (b) heating the coated sparkplug or ceramic insulator, preferably to a temperature greater than about 400° C.

Another embodiment of the present invention is a sparkplug, including a standard automotive sparkplug, which includes thereon a deep hydrocarbon or anti-lead fouling oxidation catalyst to prevent carbonization or lead-oxide fouling of the central electrode during use.

DETAILED DESCRIPTION OF THE INVENTION

I. DEFINITIONS

Figure 1:
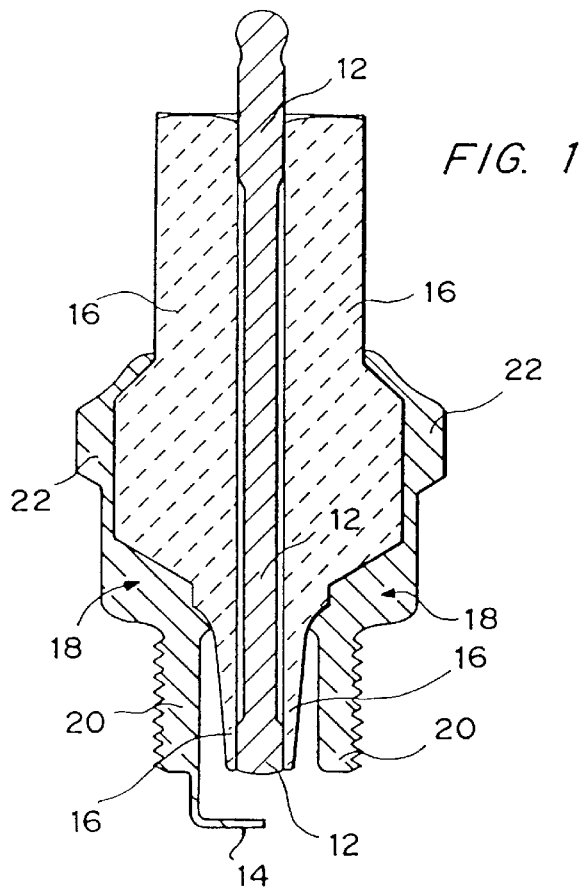
FIG. 1 of the drawing is a cross-sectional view of a typical automotive sparkplug, showing the primary components thereof.

As used herein, the term sparkplug includes sparkplugs for use in internal combustion engines, igniters for use in jet engines and igniters for use in turbines.

The term alkyl, as used herein, refer to a saturated straight, branched, or cyclic hydrocarbon, or a combination thereof, typically of $C_1$ to $C_{24}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, heptyl, octyl, nonyl, and decyl.

The terms alkenyl and alkynyl, as used herein, refers to a $C_2$ to $C_{24}$ straight or branched hydrocarbon with at least one double or triple bond, respectively.

The term aryl or aromatic, as used herein, refers to phenyl, naphthyl, or substituted phenyl or naphthyl, wherein the substituent is alkyl, alkenyl, alkynyl or alkoxy.

II. The Liquid Metal Carboxylate Composition

The liquid metal carboxylate composition is a solution of the carboxylic acid salts of one or more metals ("metal carboxylate"). Metal carboxylates are well known and can be produced by a variety of methods known to one skilled in the art. Non-limiting examples of methods for producing the metal carboxylate are shown in the following reaction schemes:

$RCOOH + Me \rightarrow (RCOO)_n Me^{n+} 0.5nH_2$ (for alkaline earth metals, alkali earth metals and thallium);

$RCOOH + Me^{n+}(OH)_n \rightarrow (RCOO)_n Me^{n+} H_2O$ (for practically all metals having a solid hydroxide);

$RCOOH + Me^{n+}(CO_3)_{0.5n} \rightarrow (RCOO)_n Me^{n+} H_2O \ CO_2$ (for alkaline earth metals, alkali earth metals and thalluim); and $RCOOH + Me^{n+}(X)_n \rightarrow (RCOO)_n Me^{n+} H_m X$ (liquid extraction, usable for practically all metals having solid salts).

The liquid metal carboxylate composition comprises one or more liquid monocarboxylic acids and one or more metal carboxylates.

The liquid metal carboxylate composition can contain a single metal, to form a single metal carboxylate, or a mixture of metals, to form a corresponding mixture of metal carboxylates. Preferably, the liquid metal carboxylate composition contains a mixture of metals, as these compositions form mixed oxides having superior properties.

Preferably, the solvent used in the liquid metal carboxylate composition is an excess of a liquid carboxylic acid which was used to form the metal carboxylate. Alternatively, the solvent can be the solution of a carboxylic acid in another solvent, including, but not limited to, organic solvents such as acetone, ethanol, methanol, propanol, benzene, toluene, chloroform and dichloromethane.

Carboxylic Acids

Carboxylic acids that are suitable for use to form the liquid metal carboxylate composition are those that: (1) can form a metal carboxylate, where the metal carboxylate is soluble in excess acid or another solvent; and (2) can be vaporized at a temperature which overlaps the oxide conversion temperature.

The carboxylic acid should have a formula R—COOH, where R is alkyl, alkenyl, alkynyl or aryl.

Preferably, the carboxylic acid is an alpha-branched monocarboxylic acid having the formula I:

$R^1$—$C(R^2)(R^3)$—COOH    I or a mixture of several acids having this formula, wherein:

$R^1$ is selected from H and $C_1$ to $C_{24}$ alkyl groups; and $R^2$ and $R^3$ are each independently selected from $C_1$ to $C_{24}$ alkyl groups.

Preferably, these alpha branched carboxylic acids have a molecular weight in the range of 130 to 420. More preferably, the carboxylic acids have a molecular weight in the range 220 to 270.

Either a single carboxylic acid or a mixture of carboxylic acids can be used to form the liquid metal carboxylate. Preferably, a mixture of carboxylic acids is used. The use of a mixture provides several advantages. First, the mixture has a broader evaporation temperature range, making it more likely that the evaporation temperature of the acid mixture will overlap the metal carboxylate decomposition temperature, allowing the formation of an optimum oxide coating. Second, the production of purified individual acids is expensive. Thus, the use of an individual acid could unnecessarily raise the cost of this method.

Preferably, the carboxylic acid is a mixture of tertiary and quaternary carboxylic acids of formula I. One preferred carboxylic acid mixture is a mixture manufactured by the Sterlitamakski Production Complex "KAUSTIK," Bashkortostan, Sterlitamak City, Russia and other petrochemical enterprises, such as the Dneprodzerzhinski Complex in Dneprodzerzhinsk city, Ukraine. These materials are sold under the name "VIK acids." The VIK acids are a material consisting of a mixture of carboxylic acids having the general formula $CH_3(CH_2)_n C(CH_3)(C_2H_5)$—COOH, wherein n is 7 to 10. The average molecular weight of the acids contained in this mixture is from about 220 to 270. This mixture also contains the acid $CH_3CH_2CH_2CH(CH_3)$—COOH as its lowest boiling acid constituent. The VIK acids should have the properties set forth in Table 1.

TABLE 1

| CHARACTERISTIC | NORM |
| --- | --- |
| appearance | transparent homogeneous liquid color less or low-yellow. |
| Color, maximum | 7.0 |
| Density at 20° C. g/cm³ | 0.90–0.93 |
| Acid Fraction composition: | |
| - content of $C_3$ acids—maximum | 1.0 |
| b) content of $C_5$—$C_{11}$, acids and higher—maximum | 90.0% |
| Acid number, mg KOH/gr | 300–350 |
| Ether number, mg KOH/gr—maximum | 20.0 |
| Water content—maximum | 0.5% |
| Refraction coefficient, η 20° C. | 1.42–1.43 |

Important properties of the VIK acid are the acid number, which should not be above 380 mg/g KOH, and the appearance; the liquid should be clear. The liquid alpha-branched carboxylic acids can be used as received from the manufacturer and do not require any additional purification, such as the removal of alcohol, ethers or other organic impurities.

B. Metals

Metals that are particularly suitable for use to form the liquid metal carboxylates include those selected from the group consisting of: Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Lanthanum, Hafnium, Tantalum, Gold, Thallium, Lead, Bismuth, Cerium, Praseodymium, Neodymium, Samarium, Europium, Gadolinium, Terbium, Dysprosium, Holmium, Erbium, Thulium, Ytterbium, Lutetium, Thorium and Uranium.

Any of the above metals or combinations thereof can be used to form coatings according to the present process. Depending on the particular use of the coating, those skilled in the art can select appropriate metal mixtures to form the desired metal or metal oxide coating. For example, the metals can be selected taking into consideration the nature of the substrate to be coated, the purpose of the substrate, and the environment to which the substrate is exposed.

For example, for the formation of a coating on the insulator of a sparkplug, the oxide coating should not be electrically conductive. In addition, if the engine is operating with a highly enriched fuel mixture, the partial reduction of iron, nickel and cobalt oxides is possible due to the interaction of these oxides with partially combusted fuel products. Thus, in these conditions, the amounts of these materials should be limited to that necessary to provide a stable coating. Preferably in these circumstances, thermodynamically stable oxides, such as chromium and cerium oxides should be the major components of the coating.

Similarly, chromium oxide should not be the sole component of the coating for a sparkplug, as it may form agglomerates or a crystalline structure with reduced resistance. Thus, if chromium is used, it is preferably used in combination with other oxides, such as cerium.

In addition, the use of divalent nickel with trivalent metals, such as cobalt, iron or chromium, may cause the formation of electrically conductive spinels. The electrically conductive spinels are, of course, undesirable for use on sparkplug insulators, although they may have other applications. Accordingly, if sparkplugs are being coated, the use of nickel with trivalent metals should be carefully monitored.

For forming coatings on sparkplugs, the liquid metal carboxylate composition preferably comprises the carboxylates of one or more of the following metals: Iron, Nickel, Cobalt, Tin, Bismuth, Chromium, Manganese and rare earth elements (except for radioactive Promethium).

More preferably, the liquid metal carboxylate composition for coating sparkplugs contains a mixture of metal carboxylates. This mixture preferably contains one metal carboxylate as its major component and one or more additional metal carboxylates as stabilizing additives. For sparkplugs, the metal carboxylate which serves as the major component is preferably iron or cerium carboxylate. More preferably, the major component is cerium carboxylate. The stabilizing additives are preferably trivalent metal carboxylates. Preferred trivalent stabilizing additives include chromium, iron, manganese and nickel carboxylates. Preferably, the liquid metal carboxylate composition contains both cerium and chromium carboxylates.

The metal forming the metal carboxylate which is the major component of the liquid metal carboxylate composition is preferably present in an amount from about 65 to 97% by weight, relative to the total weight of the metal in the composition. Preferably, the metal forming the metal carboxylate which is the major component is present in an amount from about 80–87% by weight. Another preferred amount for the metal forming the major component of the metal carboxylate composition is in the range from about 90–97% by weight.

The stabilizing additives should be present, such that the total amount of the metal in metal carboxylates which are the stabilizing additives is at least 3% by weight, relative to the total weight of the metal in the liquid metal carboxylate composition. This can be achieved by using 3% of a single stabilizing additive, or less than 3% of more than one stabilizing additive, provided that the total weight of the metal in the stabilizing additives is greater than 3%. Preferably, the total weight of the metal in the stabilizing additives is in a range from about 3% to about 35% by weight. Another preferred total weight range for the metal in the stabilizing additives is from about 3 to 30% by weight. One preferred total weight range for the metal in the stabilizing additives is from about 3 to 10 percent by weight.

Non-limiting examples of liquid metal carboxylate compositions suitable for use in the present process are set forth below. In these compositions, weight range percentages for the metals are based on 100 percent total by weight of the metal in the liquid metal carboxylate composition. As noted above, the minimum amount of the stabilizing additives, those defined below as being present in "up to" a certain amount, is a total stabilizing additive weight of at least 3 percent. For example, the liquid metal carboxylate composition can have 3% of a single stabilizing additive or 1.5% of one stabilizing additives and 1.5% of another, or 2% of one stabilizing additive and 1% of the other. Non-limiting examples of suitable compositions are: (a) up to 15% cobalt, up to 20% nickel, and the balance iron; (b) up to 10% chromium, up to 20% cobalt, and the balance cerium; (c) 3 through 5% cobalt, up to 20% chromium, and the balance cerium; (d) up to 8% chromium, up to 40% bismuth, up to 30% tin, and the balance cerium; and (e) up to 8% chromium, up to 8% iron, 20–40% cerium, 20–50% bismuth, and the balance tin.

The amount of metal in the liquid metal carboxylate composition should be enough to provide an adequate metal oxide coating. Preferably, this amount is in the range from about 30 to 50 grams of metal per kilogram of liquid metal carboxylate composition. A preferred amount of metal in the liquid metal carboxylate composition is 30 to 40 grams of metal per kilogram of liquid metal carboxylate composition. More preferably, the liquid metal carboxylate composition contains about 40 g of metal per kg of composition.

Amounts of metal less than 30 g per kg of composition can be used. However, this low concentration requires that the process be repeated several times to provide an adequate coating. Similarly, amounts of metal greater than 50 g per kg of composition can be used, however, the use of more metal raises the cost of the present Method.

One preferred liquid metal carboxylate composition used for treating sparkplugs comprises VIK acids and the following metals (metal weight percentages are given relative to the total weight of metal in the liquid metal carboxylate composition):

cerium—94 to 96% chromium—2 to 3%

Iron—2 to 3%

The above metals are preferably present in the liquid metal carboxylate composition in an amount from about 30 to 40 grams of metal per kilogram of liquid metal carboxylate composition.

Another preferred liquid metal carboxylate composition for treating sparkplugs comprises VIK acids and the following metals (metal weight percentages are given relative to the total weight of metal in the liquid metal carboxylate composition):

Cerium—about 90%

Chromium—about 7%

Cobalt—about 3%

The above metals are preferably present in the liquid metal carboxylate composition in an amount of about 50 g of metal per kilogram of liquid metal carboxylate composition.

These liquid metal carboxylate compositions are commercially available from the state enterprise Vserossiiski Scientific Research Institute of Chemical Technologies, Moscow, Russia.

II. COATING OF THE SPARKPLUG

A preferred use of the present process is the production of a non-conductive catalytic metal oxide coating on the central insulator of a spark plug. This coating prevents or reduces contamination of the insulator with electrically conductive coke or other carbon-based contaminants, and/or prevents the formation of lead-oxides on the sparkplug. The presence of such contaminants can reduce the efficiency of the sparkplug, shorten its lifespan and reduce fuel economy.

The present coating process can be used with any known process for manufacturing sparkplugs. For example, the present oxide coating can be applied to the sparkplug's ceramic insulator prior to its assembly into the completed sparkplug.

Alternatively, the coating can be applied to an assembled sparkplug. In addition, the present process can be used to form oxide coatings on sparkplugs which have been used in internal combustion engines, provided that the used sparkplug has been cleaned of any contaminants prior to formation of the oxide coating.

The present method for coating spark plugs comprises the following steps:

(1) A liquid metal carboxylate composition, or a solution thereof, is applied to a ceramic insulator, either before or after the ceramic insulator is combined with other components to form a sparkplug; and (2) The coated spark plug or ceramic insulator is heated, preferably to a temperature greater than about 400° C., for a time sufficient to convert the liquid metal carboxylate composition to a fixed oxide coating.

The liquid metal carboxylate composition can be applied to the ceramic insulator neat (without the use of an additional solvent) or in solution. Preferably, the liquid metal carboxylate composition is applied without a solvent.

Any known method of application of the liquid metal carboxylate composition is suitable for use in the present process. For example, dipping the sparkplug into a container of the liquid metal carboxylate composition will result in an optimum layer of the metal carboxylate solution. Alternatively, a swab, sponge, dropper, pipet or other applicator can be used to apply the liquid metal carboxylate composition to the sparkplugs insulator. Preferably, when the item being coated is the ceramic insulator (prior to completion of sparkplug assembly), the ceramic insulator is dipped in the liquid metal carboxylate. If the completed sparkplug is being treated, it is preferred to use a selective applicator, such as a swab, in order to avoid coating the nearby electrode.

The liquid metal carboxylate composition should be applied at a temperature less than 500° C. Preferably, the liquid metal carboxylate composition is applied to the sparkplug at room temperature.

Following application of the liquid metal carboxylate composition to the sparkplug or ceramic insulator, the sparkplug is heated to a temperature sufficient to vaporize excess carboxylic acid in the liquid metal carboxylate composition and to convert the metal carboxylates to metal oxides. The temperature for the treatment should be selected such that the temperature ranges for the evaporation of the carboxylic acid and the formation of the metal oxide overlap, and the temperature should not damage the electrode of the sparkplug, if an assembled sparkplug is being treated.

For sparkplugs and components thereof, this temperature is preferably greater than about 400° C. The upper limit for the heat treatment is dependent on the material used in the sparkplug being treated. The temperature should be selected so that it will not damage the sparkplug which is being coated. Different metal sparkplug electrodes can withstand different furnace temperatures. For example, sparkplugs that have a zinc-coated electrode are preferably treated at temperatures below 420° C., as higher temperatures can damage the sparkplug's appearance. In contrast, sparkplugs with nickel-coated electrodes can be treated at temperatures up to 550° C. without any adverse effects. Where just the ceramic insulator is being coated, prior to the addition of the electrode, even higher temperatures can be used, in some cases, as high as 700° C. A preferred temperature range is from about 400 to 650° C. Another preferred temperature range is from about 400 to 550° C. A temperature range of about 420–550° C. has been found to be particularly preferred, since it is high enough to ensure compact coating of the ceramic with the coating, but low enough to ensure that the temperature will not damage the sparkplug.

During the heat treatment of the sparkplug, two processes take place. These processes can occur at different temperature levels. The first process is the evaporation or decomposition of the excess carboxylic acid in the liquid metal carboxylate composition. This forms a metal carboxylate layer on the surface of the sparkplug. The second stage is the decomposition of the metal carboxylate layer to a metal oxide layer and fixation of that layer on the backing or substrate surface.

To create an oxide layer which is fixed to the surface of the ceramic, it is preferred that there be an interaction between the ceramic and the coating during the coating process. Optimum oxide layer production occurs when the temperature at which the carboxylate decomposes and the acid evaporates overlap. That is, when the carboxylate decomposition stage commences, the removal and decomposition of the acid is not complete. Complete removal of the acid, prior to the commencement of carboxylate decomposition can reduce the adhesion of the oxide coating to the substrate.

Without wishing to be bound to any particular mechanism, it is believed that the following process occurs during the production of the oxide coating. At high temperatures, it is believed that the carboxylic acid etches or otherwise interacts with the substrate, activating it. This allows interaction between the metal carboxylate and the activated substrate, resulting in the formation of a strong substrate-oxide link.

The heating can be conducted either by placing the coated sparkplug (or ceramic insulator) onto a rack or support and then into a furnace, which has been preheated to a desired temperature, or by placing the coated sparkplug (or ceramic insulator) into a furnace, followed by heating the furnace to the desired temperature. Any conventional furnace can be used, as no special heating equipment is required.

The sparkplug should be heated for a time adequate to produce a uniform oxide coating. For a furnace which has been preheated to a temperature above 400° C., a preferred minimum time is at least about 2 min. If several sparkplugs are being treated, uneven heating might take place. For example, the peripheral sparkplugs will probably heat to working temperature faster than the sparkplugs located in the center of the group. Accordingly, batches of sparkplugs should be heated longer, depending on the type of furnace used.

Preferably, the heat treatment should be carried out for at least four minutes at the desired temperature. More preferably, the heat treatment should be carried out for 15 to 20 minutes. However, the heat treatment may be carried out for longer periods without damage to the sparkplug or the coating.

Following treatment, the sparkplug should be allowed to cool to room temperature. Forced air cooling may be used to accelerate the cooling process. The sparkplug should not be cooled by treating it with a liquid coolant, as this could damage the coating or the insulator.

The present process is carried out in a normal, i.e. ambient atmosphere. Accordingly, there is no need to provide any special atmosphere in the furnace during the heating process. However, should it be desired, the present process can also be conducted in specialized atmospheres. If a specialized atmosphere is used, it is preferably an oxidizing atmosphere, that is, one which is enriched with oxygen.

In treating sparkplugs to prevent the buildup of lead oxide, one preferred method uses an Argon atmosphere during the heating step, with the sparkplugs being heated to between 430–450° C.

The present process allows the production of sparkplugs with carbonization-resistant and lead-fouling resistant central electrodes, without using noble metals. This will reduce the cost of production of the sparkplugs. The method also makes it possible to improve properties of manufactured sparkplugs and used sparkplugs.

FIG. 1 shows the general structure of a typical automotive sparkplug 10. As shown therein, a sparkplug generally comprises two electrodes, a central electrode 12 and an "earth" electrode 14, an insulator 16 surrounding the central electrode 12, and a body 18 that surrounds a portion of the insulator 16, with a screw thread 20 and a connector nut 22.

Figure 2:
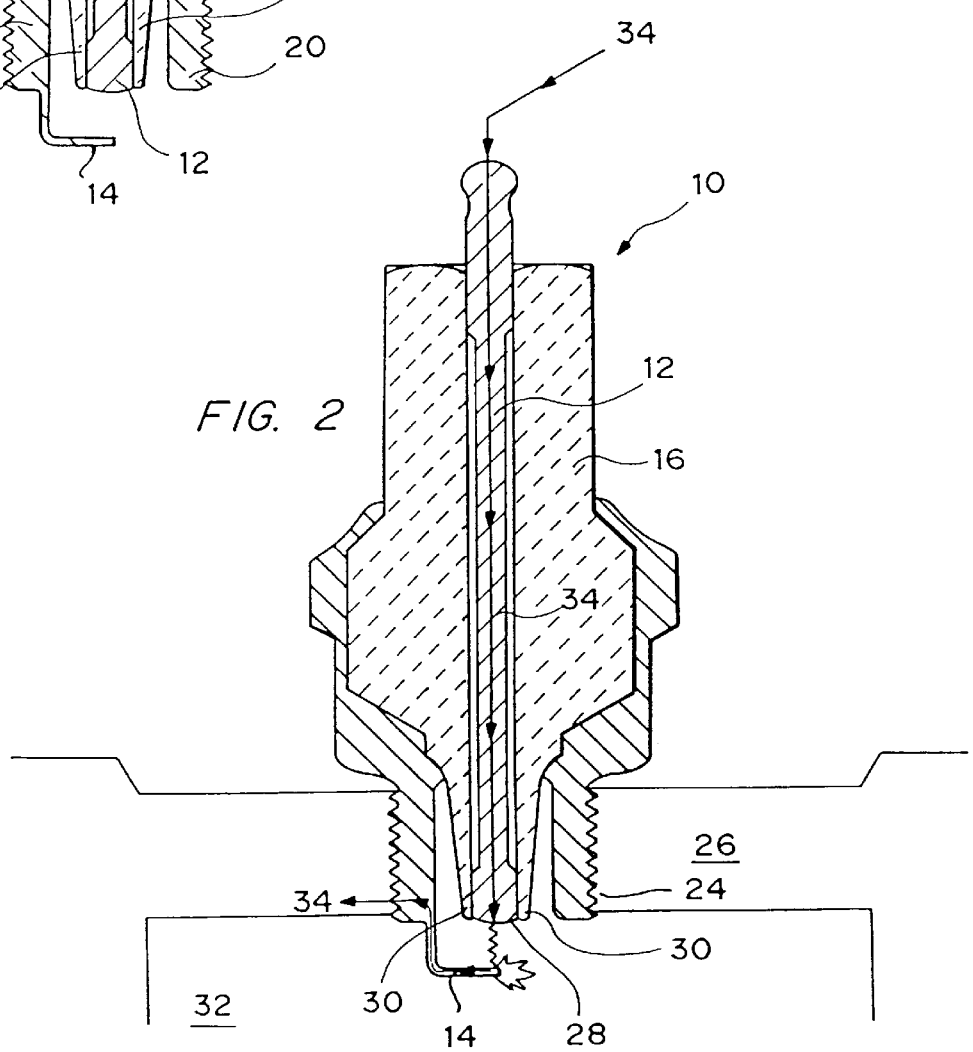
FIG. 2 is a cross-sectional view of the sparkplug of FIG. 1, showing the normal current path therein.

Turning to FIG. 2, the sparkplug 10 is threaded into a threaded bore 24 in an engine block 26, with the earth electrode 14, the tip 28 of the central electrode 12 and the tip 30 of the ceramic insulator 16 projecting into the cylinder region 32 of the engine block 26. The ignition current from the electical distributor (not shown) passes through a cable (not shown) into the top of the central electrode 12. The path of the current is generally shown by line 34. The current 34 passes through the central electrode 12 and leaps from the central electrode 12 to the earth electrode 14, creating the spark that ignites the fuel within the cylinder 32. As a result, the earth electrode 14, the tip 28 of the central electrode 12 and the tip 30 of the ceramic insulator 16 are exposed to the hot combustion gases within the cylinder 32.

Figure 3:
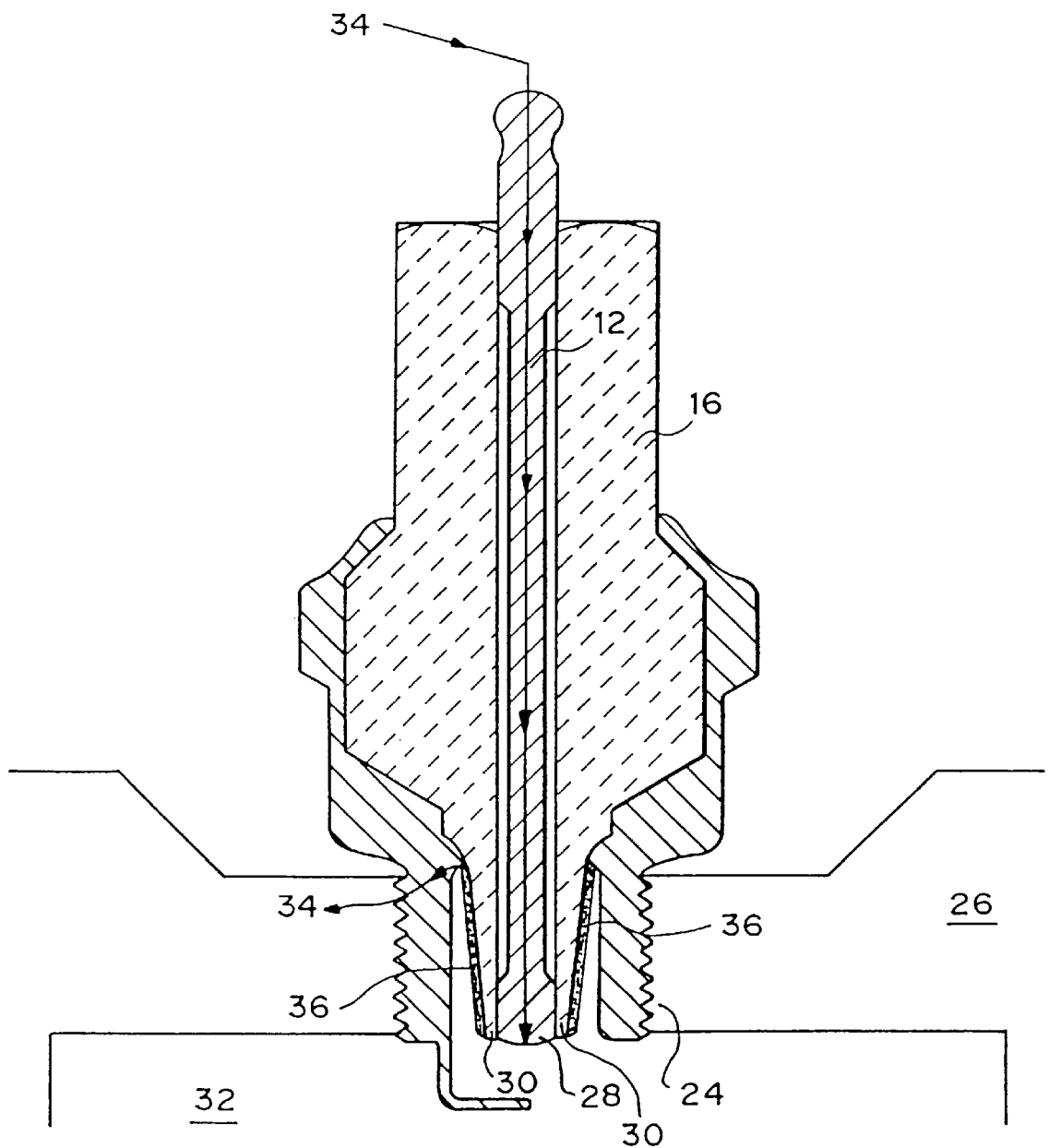
FIG. 3 is similar to the view of FIGS. 1 and 2, showing a buildup of electoconductive material on the ceramic insulator, and showing the resulting dissipated flow of current therein.

FIG. 3 shows the sparkplug of FIG. 2, with a buildup of electroconductive contaminant 36 on the tip 30 of the ceramic insulator 16. As shown in FIG. 3, the electrical current (shown by line 34) is dissipated through the contaminant layer 36 on the insulator 16, and into the metal engine block 26, reducing the sparking efficiency of the sparkplug.

Figure 4:
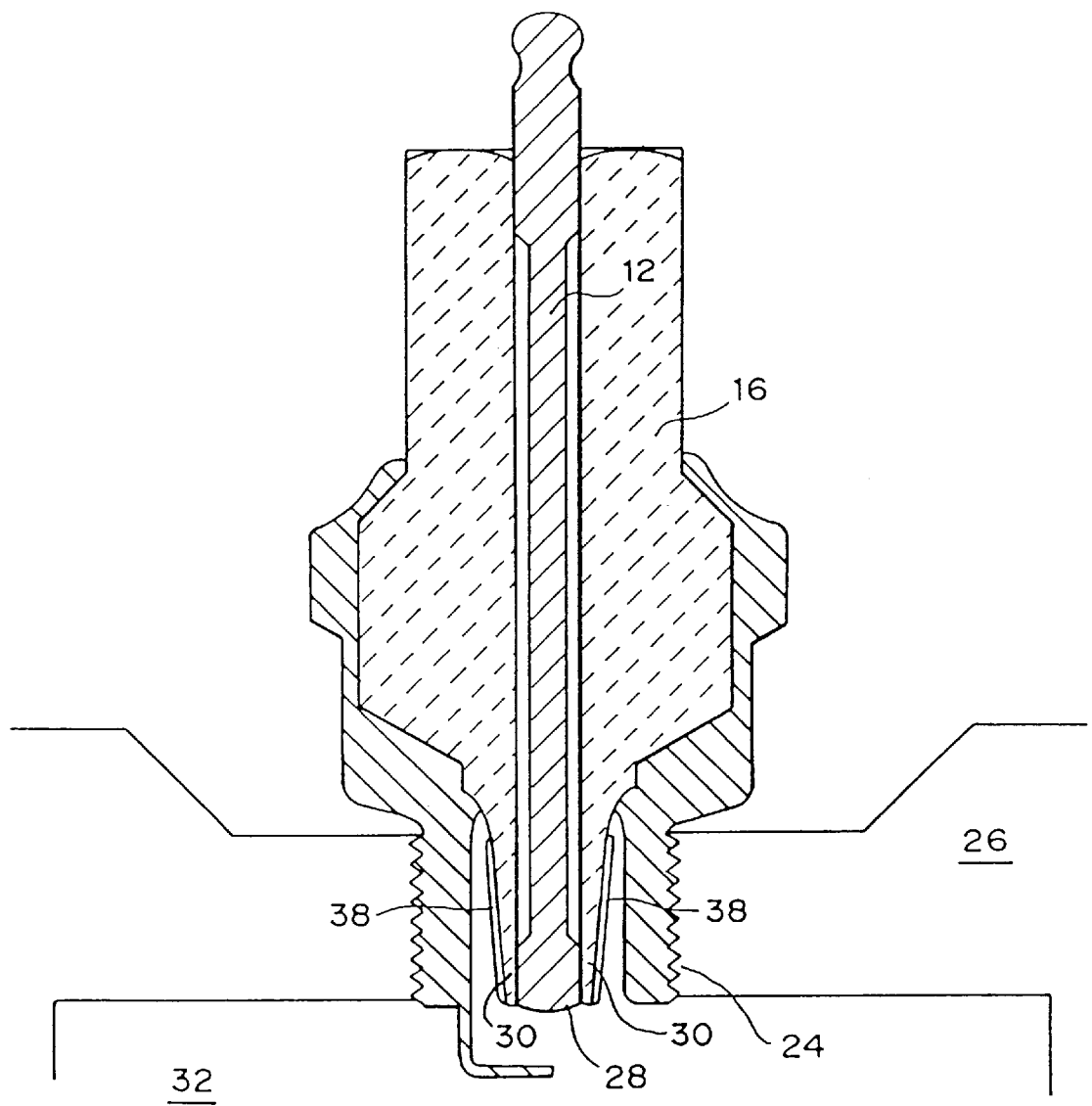
FIG. 4 is similar to the view of FIGS. 1–3, showing a coating of metal oxide material deposited onto the ceramic insulator, in accordance with the present invention.

In FIG. 4, the tip 30 of the insulator 16 has been coated with a metal oxide coating 38 in accordance with the present invention, preventing the buildup of contaminants on the coated surfaces.

III. EXAMPLES

The following examples illustrate the application of the present process to the coating of sparkplugs.

The metal carboxylate compositions used in Examples 1 to 3 were obtained from VserosBiiski Scientific Research Institute of Chemical Technologies, in Moscow, Russia.

Example 1
Preparation of Coated Insulator

The upper electrode to which a sparkplug wire was attached, was removed from a group of sparkplugs. The sparkplugs were then placed in a basket in a container over a boiling hydrocarbon solvent, in order to remove any grease or organic contamination which was present on the sparkplug. The basket containing the sparkplugs was removed from the degreasing chamber and was cooled to a temperature below 50° C.

The degreased sparkplugs were placed in a holder, with the threaded portion of the sparkplug facing up, and were placed in a furnace which had been preheated to a temperature in the range 180 to 220° C. This treatment removed any solvent or moisture which had been absorbed onto the sparkplug. The sparkplugs were removed from the furnace and cooled to a temperature below 50° C.

Two drops of a liquid metal carboxylate mixture were manually applied to the tip of the central electrode insulator of each spark plug. The metal carboxylate mixture had the following proportions of metal: 90% cerium, 7% chromium, and 3% cobalt. The carboxylic acid was VIK acid. The total metal concentration in the liquid carboxylate mixture was 50 g metal per kilogram of liquid carboxylate mixture.

The sparkplugs were placed in a furnace which had been heated to a temperature of 420° C. and were kept in the furnace for 30 minutes, forming the oxide coating. At the conclusion of the heat treatment, the sparkplugs were cooled to room temperature, and the upper electrode was reassembled into the sparkplug to provide the completed article.

Example 2
Preparation of Coated Sparkplug

A Russian type All/1 sparkplug was prepared (degreased and dried) as set forth in Example 1, without the removal of the central electrode. The sparkplugs central insulator was dipped into the liquid carboxylate composition used in Example 1 to a depth between 10 to 15 mm. The sparkplug was then introduced into a furnace which had been preheated to 650° C., kept in the furnace for 10 minutes, removed and cooled to room temperature.

Example 3
Coating of a Previously Used Sparkplug

The procedure of Example 2 was repeated using a Russian All/1 sparkplug which had been used in an internal combustion engine which had been run for 20,000 kilometers. A coated sparkplug was produced.

Example 4
Use of Coated Sparkplug

The sparkplugs manufactured according to the process set forth in Example 2 were used in a Lada automobile to determine their effects on the performance of the automobile, compared to uncoated sparkplugs. The use of the sparkplugs coated according to the present process significantly reduced the average time necessary to start the engine of a Lada automobile in cold weather from 2 min to 15–20 sec. In addition, the fuel consumption economy of the engine was improved by 5–7%.

As noted above, the present invention provides a method for manufacturing sparkplugs that will provide increased engine performance sparkplug life. Moreover, although the invention has been specifically described by reference to various preferred embodiments, it will be readily understood by persons of skill in the art that various modifications of the present invention came be made without varying from the scope and spirit of the invention as set forth in the following claims.

We claim:

1. A method for forming a metal oxide coating on a ceramic sparkplug insulator, comprising the steps of:
   (a) applying a liquid metal carboxylate composition comprising a carboxylate of a rare earth metal to the ceramic sparkplug insulator; and (b) heating the insulator for a time and at a temperature sufficient to form a coating thereon.

2. The method of claim 1, wherein the insulator is heated to a temperature greater than about 400° C.

3. The method according to claim 2, wherein the insulator is heated for at least about two minutes.

4. The method according to claim 1, wherein the liquid metal carboxylate composition comprises one or more liquid monocarboxylic acids and one or more metal carboxylates.

5. The method of claim 4, wherein the liquid metal carboxylate composition comprises more than one metal carboxylate, and wherein the additional metal carboxylate comprises a metal that is selected from the group consisting of Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Lanthanum, Hafnium, Tantalum, Gold, Thallium, Lead, Bismuth, Cerium, Praseodymium, Neodymium, Samarium, Europium, Gadolinium, Terbium, Dysprosium, Holmium, Erbium, Thulium, Ytterbium, Lutetium, Thorium and Uranium.

6. The method of claim 5, wherein the metal is selected from the group consisting of Lithium, Beryllium, Sodium, Magnesium, Potassium, Calcium, Scandium, Titanium, Chromium, Manganese, Iron, Nickel, Cobalt, Copper, Zinc, Gallium, Yttrium, Zirconium, Silver, Cadmium, Tin, Cesium, Cerium, Barium, Gold, Thallium, Lead, Bismuth and Cerium.

7. The method of claim 6, wherein the liquid metal carboxylate composition comprises the following metals:
   0–8 wt % Chromium;
   0–8 wt % Iron;
   20–40 wt % Cerium;
   20–50 wt % Bismuth; and
   the balance Tin.

8. The method of claim 5, wherein the one or more liquid monocarboxylic acids comprises one or more carboxylic acids of formula:
   R—C(R")(R')—COOH
wherein:
   R is selected from the group consisting of H and $C_1$ to $C_{24}$ alkyl groups; and
   R' and R" are each independently selected from the group consisting of $C_1$ to $C_{24}$ alkyl groups.

9. The method of claim 8, wherein the one or more liquid monocarboxylic acids are a mixture of acids having molecular weights in the range of 130 to 420.

10. The method of claim 5, wherein the metal is selected from the group consisting of iron, nickel, cobalt, chromium, manganese, and any rare earth elements, provided that the rare earth element is not promethium.

11. The method of claim 5, wherein the metal is a mixture comprising:
   up to 20% by weight of cobalt;
   up to 10% by weight of chromium; and
   the balance cerium;
   wherein the minimum total amount of cobalt and chromium is at least 3%.

12. The method of claim 11, wherein the one or more liquid monocarboxylic acids are a mixture of acids having molecular weights in the range 220 to 270.

13. The method of claim 12, wherein the amount of metal in the liquid metal carboxylate composition is 30 to 40 grams of metal per kilogram of liquid metal carboxylate composition.

14. The method of claim 5, wherein the metal is a mixture comprising:
   3 through 5% by weight of cobalt,
   0 through 20% by weight of chromium,
   and the balance cerium.

15. The method of claim 5, wherein the one or more liquid monocarboxylic acids is a mixture of carboxylic acids of formula $CH_3(CH_2)_nC(CH_3)(C_2H_5)$—COOH, wherein n is 7 to 10, and $CH_3CH_2CH_2CH(CH_3)$—COOH.

16. The method of claim 5, wherein the amount of metal in the liquid metal carboxylate composition is in the range of 30–50 grams of metal per kilogram of liquid metal carboxylate composition.

17. The method of claim 5, wherein the liquid metal carboxylate composition comprises the following metals:
   Cerium—94 to 96 wt %
   Chromium—2 to 3 wt %
   Iron—2 to 3 wt %
wherein the total amount of the metals in the liquid metal carboxylate composition is in the range from about 30 to 40 grams of metal per kilogram of the liquid metal carboxylate composition.

18. The method of claim 5, wherein the liquid metal carboxylate composition comprises the following metals:
   Cerium—90 wt %
   Chromium—7 wt %
   Cobalt—3 wt %
wherein the total amount of metals present in the liquid metal carboxylate composition is about 50 grams of metal per kilogram of the liquid metal carboxylate composition.

19. The method of claim 1, wherein the ceramic insulator is heated to a temperature in the range from about 400° C. to 700° C.

20. The method of claim 1, wherein the ceramic insulator is heated to a temperature in the range from about 400° C. to 650° C.

21. The method of claim 1, wherein the ceramic insulator is heated to a temperature in the range from about 400° C. to 550° C.

22. A sparkplug for an internal combustion engine comprising:
   a central electrode having an end adapted to face a combustion chamber of the engine;
   a ceramic insulator having an end portion adapted to face the combustion chamber of the engine, the terminal end of the end portion having coated thereon a coating that comprises a metal oxide layer comprising a rare earth metal oxide and optionally one or more additional oxides selected from the group consisting of iron, nickel, cobalt, chromium, manganese and other rare earth element oxides, the central electrode being substantially enclosed within the ceramic insulator such that the end adapted to face the combustion chamber extends outwardly from the coated end portion of the ceramic insulator; and
   a ground electrode adjacent to the end of the central electrode adapted to face the combustion chamber to define a spark gap between the ground electrode and the end of the central electrode.

23. The sparkplug of claim 22, wherein the metal oxide coating is a mixture having:
   0 through 10 wt % chromium, 0 through 20 wt % cobalt, and the balance cerium oxide.

24. The sparkplug of claim 23, wherein the metal oxide coating is a mixture having 3 wt % through 5 wt % cobalt, 0 through 20 wt % chromium, and the balance cerium oxides.

25. The sparkplug of claim 22, wherein the metal oxide composition comprises about 94 to 96 wt % Cerium Oxide, about 2 to 3 wt % Chromium oxide and about 2 to 3 wt % Iron Oxide.

26. The sparkplug of claim 22, wherein the metal oxide composition comprises about 90 wt % Cerium oxide, about 7 wt % Chromium Oxide and about 3 wt % Cobalt oxide.

27. A method for forming a metal oxide coating on a ceramic sparkplug insulator, comprising the steps of:

(a) applying a liquid metal carboxylate composition comprising a rare earth metal carboxylate to the ceramic sparkplug insulator; and (b) heating the insulator in an oxidizing atmosphere for a time and at a temperature sufficient to form a coating thereon.

28. The method of claim 27 in which the oxidizing atmosphere is air.

29. The method of claim 27 wherein the liquid metal carboxylate composition comprises one or more liquid monocarboxylic acids and a mixture of metal carboxylates.

30. The method of claim 29, wherein the mixture of metal carboxylates comprises one or more metals selected from the group consisting of Lithium, Beryllium, Sodium, Magnesium, Potassium, Calcium, Scandium, Titanium, Chromium, Manganese, Nickel, Cobalt, Copper, Zinc, Gallium, Rubidium, Strontium, Yttrium, Silver, Cadmium, Tin, Cesium, Barium, Lanthanum, Hafnium, Tantalum, Gold, Thallium, Lead, Bismuth, Cerium, Praseodymium, Neodymium, Samarium, Europium, Gadolinium, Terbium, Dysprosium, Holmium, Erbium, Thulium, Ytterbium, Lutetium, Thorium and Uranium.

31. The method of claim 29, wherein the mixture of metal carboxylates comprises additional metal carboxylates having one or more metals selected from the group consisting of Iron, Nickel, Cobalt, Chromium, Manganese and any rare earth elements, provided that the rare earth element is not Promethium.

* * * * *